(12) United States Patent
Komura

(10) Patent No.: US 11,911,778 B2
(45) Date of Patent: Feb. 27, 2024

(54) CONTINUOUS CENTRIFUGE WITH AIR TRAP FOR CAPTURING BUBBLES

(71) Applicant: Eppendorf Himac Technologies Co., Ltd., Ibaraki (JP)

(72) Inventor: Takato Komura, Ibaraki (JP)

(73) Assignee: Eppendorf Himac Technologies Co., Ltd., Ibaraki (JP)

( * ) Notice: Subject to any disclaimer, the term of this patent is extended or adjusted under 35 U.S.C. 154(b) by 667 days.

(21) Appl. No.: 17/059,263

(22) PCT Filed: Apr. 26, 2019

(86) PCT No.: PCT/JP2019/017902
§ 371 (c)(1),
(2) Date: Nov. 27, 2020

(87) PCT Pub. No.: WO2019/230299
PCT Pub. Date: Dec. 5, 2019

(65) Prior Publication Data
US 2021/0205824 A1   Jul. 8, 2021

(30) Foreign Application Priority Data
May 31, 2018   (JP) ................................. 2018-104660

(51) Int. Cl.
*B04B 15/04* (2006.01)
*B01D 19/00* (2006.01)
(Continued)

(52) U.S. Cl.
CPC .......... *B04B 15/04* (2013.01); *B01D 19/0052* (2013.01); *B04B 1/02* (2013.01); *B04B 11/02* (2013.01)

(58) Field of Classification Search
CPC .......... B04B 15/04; B04B 1/02; B04B 11/02; B04B 5/0442; B04B 7/08; B04B 2005/0464; B01D 19/0052
See application file for complete search history.

(56) References Cited

U.S. PATENT DOCUMENTS 1,828,548 A * 10/1931 Shapley .................... B04B 3/04
                                                         210/374
3,795,451 A *  3/1974 Mailen .............. B01F 35/71725
                                                         250/576
(Continued)

FOREIGN PATENT DOCUMENTS

EP   3747481 A1 * 12/2020 .......... A61M 1/0209
EP   4108266 A1 * 12/2022 ........ A61M 1/36224
(Continued)

OTHER PUBLICATIONS

"International Search Report (Form PCT/ISA/210) of PCT/CN2019/017902", dated Jun. 25, 2019, with English translation thereof, pp. 1-4.
(Continued)

*Primary Examiner* — Charles Cooley
(74) *Attorney, Agent, or Firm* — JCIPRNET

(57) ABSTRACT

In a continuous centrifuge, a core end surface component separated from a core body is arranged inside a rotor, an air trap mechanism which automatically captures bubbles inside a sample is formed, and the bubbles are removed by centrifugal separation before the sample is sent to an outer circumferential portion having a high liquid pressure. In addition, when viewed in the axial direction, the core body and an upper rotor cover abut each other, and the core end surface component and a lower rotor cover abut each other, with appropriate pressure by biasing the core end surface component and the core body with a spring. Because a flow path between the rotor core and the rotor covers is main-
(Continued)

tained in a perfect state and the bubbles in liquid are also removed, the flow path may not be blocked by the bubbles and the centrifugal separation can be stably performed.

9 Claims, 11 Drawing Sheets

(51) Int. Cl.
  *B04B 1/02* (2006.01)
  *B04B 11/02* (2006.01)

(56) References Cited

U.S. PATENT DOCUMENTS

| | | | |
|---|---|---|---|
| 3,998,382 A | 12/1976 | Decker et al. | |
| 7,794,383 B2 * | 9/2010 | Tetsu | B04B 5/0414 494/60 |
| 2006/0009341 A1 * | 1/2006 | Tobita | B04B 1/02 494/61 |
| 2008/0035585 A1 * | 2/2008 | Antwiler | A61M 1/3696 422/72 |
| 2008/0300124 A1 * | 12/2008 | Akatsu | B04B 15/02 494/14 |
| 2010/0075823 A1 * | 3/2010 | Toi | B04B 5/0442 494/6 |
| 2011/0190111 A1 * | 8/2011 | Toi | B04B 15/00 494/10 |
| 2013/0017943 A1 * | 1/2013 | Toi | B04B 13/00 494/35 |
| 2013/0331251 A1 * | 12/2013 | Toi | B04B 9/10 494/9 |
| 2015/0057141 A1 * | 2/2015 | Toi | B04B 13/00 494/10 |
| 2019/0137931 A1 * | 5/2019 | Mueth | G01N 15/14 |
| 2020/0061637 A1 * | 2/2020 | Shartle | B01L 3/502715 |
| 2021/0205824 A1 * | 7/2021 | Komura | B04B 1/02 |
| 2023/0226562 A1 * | 7/2023 | Kusters | A61M 1/3696 494/1 |

FOREIGN PATENT DOCUMENTS

| | | | | |
|---|---|---|---|---|
| JP | S6157834 | | 4/1986 | |
| JP | S6179657 | | 5/1986 | |
| JP | 2004024374 A | * | 1/2004 | ........... B04B 5/0442 |
| JP | 2004290354 | | 10/2004 | |
| JP | 2004290354 A | * | 10/2004 | ......... A61M 1/3693 |
| JP | 2013022473 | | 2/2013 | |
| WO | WO-2019230299 A1 | * | 12/2019 | ......... B01D 19/0052 |

OTHER PUBLICATIONS

"Office Action of China Counterpart Application" with English translation thereof, dated Oct. 27, 2021, p. 1-p. 11.
"Office Action of China Counterpart Application" with English translation thereof, dated Apr. 15, 2022, p. 1-p. 8.

* cited by examiner

CONTINUOUS CENTRIFUGE WITH AIR TRAP FOR CAPTURING BUBBLES

CROSS-REFERENCE TO RELATED APPLICATION

This application is a 371 application of the International PCT application serial no. PCT/JP2019/017902, filed on Apr. 26, 2019, which claims the priority benefits of Japan Patent Application No. 2018-104660, filed on May 31, 2018. The entirety of each of the above-mentioned patent applications is hereby incorporated by reference herein and made a part of this specification.

BACKGROUND

Technical Field

The present invention relates to a continuous centrifuge which allows a sample to continuously flow and centrifugally separates particles in the liquid sample in a rotor, and particularly, the present invention aims to be capable of removing air mixed in the sample which is sent into the rotor.

Related Art

A centrifugal separator separates particles that do not settle or hardly settle in a normal gravitational field, and for example, viruses, bacterial cells and the like are included as targets to be separated. The viruses and the bacterial cells are necessary raw materials for production of drugs, vaccines and the like, and a continuous centrifuge is widely used as a facility for separating and refining the raw materials in these production processes. The continuous centrifuge includes a rotor that rotates at high speed, two rotating shafts which have penetration holes that are connected to upper and lower sides of the rotor, and a sample supply portion for supplying a sample to the rotor.

With regard to the sample supply portion, a system has been proposed in which a liquid sending pump for supplying the sample, a flow meter, and a pressure gauge are connected by a silicon tube or the like. When the continuous centrifuge is rotating, the rotor must be completely filled with liquid. If the operation is performed when the liquid is not completely filled, there is a possibility that the rotor may become unbalanced and excessive vibration may occur, which is not preferable. In the worst case, the continuous centrifuge may vibrate abnormally and must be shut-down. In addition, if air remains in a sample line, there is a possibility that pressure of the sample line when the sample is injected may become high, and the sample cannot be injected at a predetermined flow rate. In addition, when the rotor rotates at high speed, a flow path for making the sample flow in a radial direction and sending the sample to a space for centrifugal separation is formed between a core body and a lower rotor cover, but because the liquid pressure increases toward an outer periphery during centrifugation, minute bubbles in the sample cannot be sent to an outermost part and the flow path is clogged, which makes the sample difficult to flow and the pressure for sending the sample increase. In order to obtain stable centrifugal separation performance in the continuous centrifuge, a low pressure for sending the sample is preferable, and thus it is important to remove the air remaining in the sample line so that the air does not enter the rotor. For example, Patent Literature 1 proposes a continuous centrifuge in which whether the air is mixed in the sample line or not can be easily detected, and the air in the sample line is discharged before being injected into a rotor chamber.

LITERATURE OF RELATED ART

Patent literature

Patent Literature 1: Japanese Patent Laid-open No. 2013-22473

SUMMARY

Problems to be Solved

When a transparent or semi-transparent tube such as a silicon tube is used as a sample line piping which is used in a continuous centrifuge, whether there is air in a sample line may be visually checked, and thus the air can be discharged from the sample line by manual operation performed by an operator, such as picking up the silicon tube to once increase pressure of the sample line and then release the pressure, and the like. However, even if the air is discharged by the manual operation, not only the air cannot be completely discharged, but also the air mixed as bubbles in the sample is difficult to be discharged. As a countermeasure against the problem described above, in Patent Literature 1, the bubbles are detected by an air sensor before the sample enters the rotor and are discharged to the outside via a three-way passage. However, minute bubbles below a detection limit of the air sensor and bubbles dissolved in the sample liquid cannot be detected, and thus the bubbles cannot be removed. Furthermore, the bubbles contained in the sample may also be dissolved in the sample and appear when subjected to a centrifugal force, and it is difficult to completely separate the bubbles before supplying the sample to the rotor.

The present invention is accomplished in view of the background described above, and an object of the present invention is to provide a continuous centrifuge in which an air trap mechanism is arranged which captures gas mixed in the sample that flows into the rotor, and the gas such as the air or the like cannot enter the separation space for performing the centrifugal separation. Another object of the present invention is to provide a continuous centrifuge in which an air trap function can be easily achieved only by replacing a rotor core portion of an existing continuous centrifuge. Still another object of the present invention is to provide a continuous centrifuge in which an influence of a load acting on the rotor core caused by deformation of the rotor body during high speed rotation is reduced, and the life of the rotor is extended.

Means to Solve Problems

Features of typical ones of the invention disclosed in the application are described as follows. According to one feature of the present invention, the continuous centrifuge includes: a rotor having a core that partitions an interior into a plurality of spaces for separating a sample; a rotor chamber that accommodates the rotor; a drive portion for rotating the rotor; and a sample line for continuously supplying the sample to the rotor and discharging the sample from the rotor during rotation of the rotor, wherein an air trap is arranged for capturing bubbles from the sample by a centrifugal force before the sample which is supplied from the sample line reaches a sample separation space in the rotor. The air trap is arranged in the interior of the rotor, separates the bubbles from the sample with the centrifugal force by rotating together with the rotor, and sends the sample after the bubbles are separated to the sample separation space. The air trap is disposed in an inner peripheral part of the sample separation space of the core.

According to another feature of the present invention, the core has a hollow cylindrical body portion in which blade-shaped partition walls evenly dividing the interior of the rotor into a plurality of spaces are protruded on an outer circumferential portion, and end portions which are arranged in a manner of closing an upper end surface and a lower end surface of the body portion. The air trap includes a concave portion which is formed in an end portion of the body portion on a sample supply side, and a core end surface component that fits into the concave portion for forming a centrifugal separation space in the concave portion. In addition, the core end surface component is movable in a rotation shaft direction with respect to the core, and is biased, by disposing a spring in the concave portion, in a direction in which the core and the core end surface component are separated. Furthermore, an opposite side of the core of the core end surface component is formed into an annular shape corresponding to an inner wall surface of a rotor cover on the sample supply side of the rotor. In the annular part of the core end surface component, a plurality of axial flow paths and radial flow paths are formed, and in the plurality of axial flow paths, the sample is extracted from an outer peripheral side of the centrifugal separation space to the opposite side of the core in the axial direction, and the radial flow paths are grooves formed on a surface on the opposite side of the core of the core end surface component and extend radially from the axial flow paths in a radial direction.

According to still another feature of the present invention, the radial flow paths are formed by the grooves formed on the surface on the opposite side of the core of the core end surface component and an inner peripheral surface of the rotor cover. The rotor includes a cylindrical rotor body, and an upper rotor cover and a lower rotor cover that are installed in a manner of closing an upper opening and a lower opening of the rotor body; and in the core end surface component, a sample passage is formed which extends along a rotation shaft center and communicates a sample inflow passage of the lower rotor cover, and an outlet opening of the sample passage opens in a middle peripheral part in the radial direction in the centrifugal separation space. The core is pressed against an inner wall surface of the upper rotor cover by a biasing force of the spring.

Effect

According to the present invention, because bubbles in a sample supplied into a rotor are separated by a dedicated air trap mechanism arranged in the rotor, the bubbles (air) that reach a centrifugal separation space in the rotor can be certainly removed, and a flow rate injected to an outer circumferential portion of the core body can be maintained at a predetermined flow rate. In addition, because the air trap mechanism is achieved by an improved core body and a core end surface component, the present invention can be easily conducted only by replacing a conventional core (a rotor core). Furthermore, because the bubbles (air) reaching the centrifugal separation space of the core body can be certainly removed, low liquid sending pressure can be maintained when the sample to reach the centrifugal separation space is supplied, and stable separation performance can be obtained. In addition, long life of both the rotor and the rotor core can be accomplished by not being subjected to a load caused by deformation of the rotor.

DESCRIPTION OF THE EMBODIMENTS

Embodiment 1

An embodiment of the present invention is described below based on drawings. Moreover, in the following drawings, the same parts are designated by the same symbols and repeated description is omitted.

Figure 1:
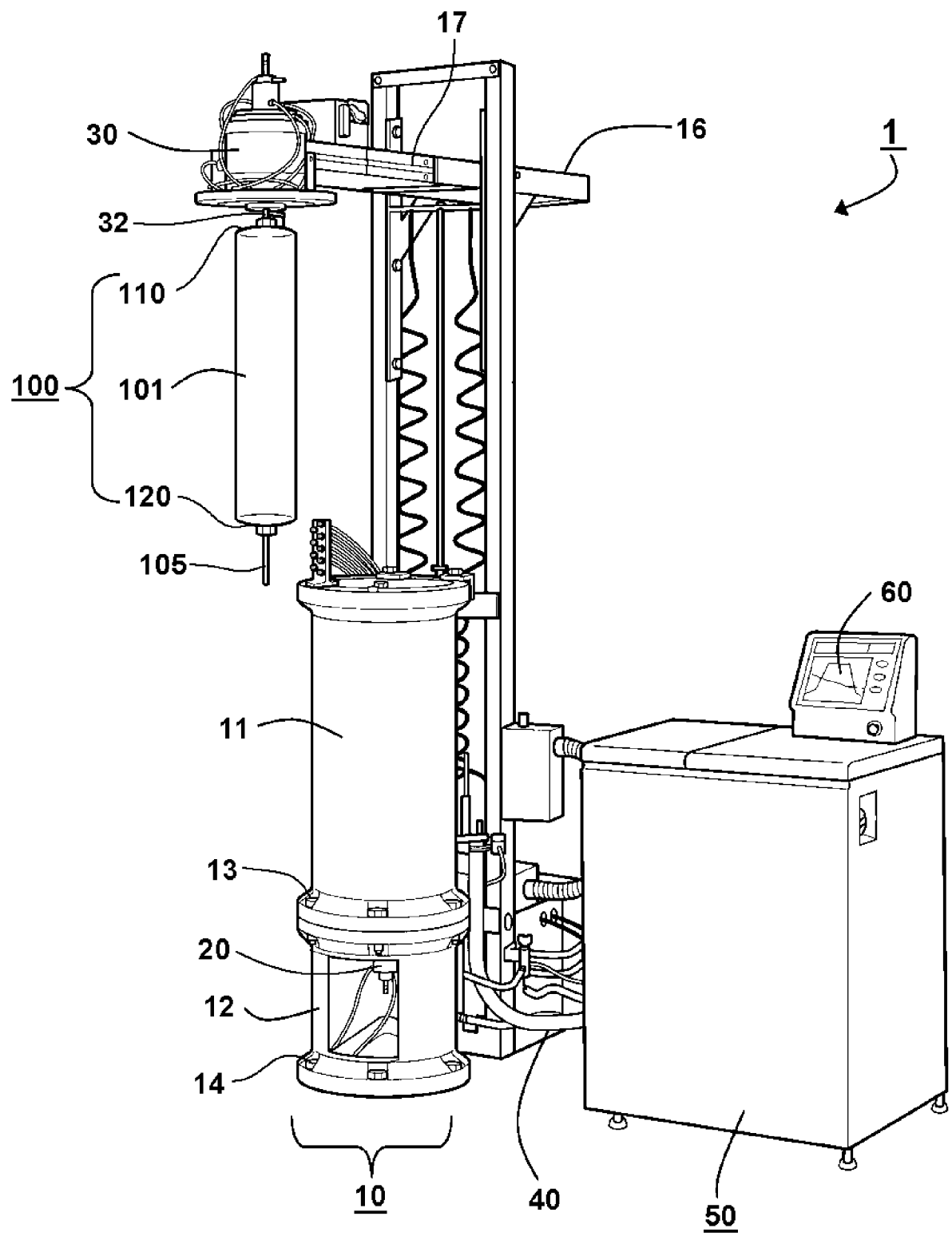
FIG. 1 is a perspective view showing an entire continuous centrifuge according to an embodiment of the present invention.

FIG. 1 is a perspective view showing an entire continuous centrifuge (a continuous centrifugal separator) 1 according to the embodiment. As shown in FIG. 1, the continuous centrifuge 1 is a so-called "continuous ultra-centrifugal separator" which is used in a vaccine manufacturing process and the like, and includes two main parts, namely a centrifugal separation portion 10 and a control device portion 50. The centrifugal separation portion 10 and the control device portion 50 are connected by a wiring/pipe group 40. The continuous centrifuge 1 has a structure in which a rotor 100 suspended by a drive portion 30 can be taken in and out of a chamber 11 by operating a lift 16 and an arm 17. The centrifugal separation portion 10 has: the cylindrical chamber 11 which is a rotor chamber; a base 12 which supports the chamber 11; the rotor 100 which is accommodated in an interior of the chamber 11 in a way of being freely taken in and out of the chamber 11 and rotates at high speed; the drive portion 30 which is disposed above the chamber 11 and rotationally drives the rotor 100 in a state of suspending the rotor 100; a lower bearing portion 20 installed on a lower side of the chamber 11; the lift 16 and the arm 17 for moving the drive portion 30 in an up-and-down direction and a back-and-forth direction; and a liquid sending pump 73 (see FIG. 2) that continuously supplies or discharges a sample or a sterilizing solution to the rotor 100. The rotor 100 suspended by the drive portion 30 is accommodated in the interior of the chamber 11. An outer surface of the rotor 100, which is a rotation body, includes a cylindrical rotor body 101 which is a body portion, and an upper rotor cover 110 and a lower rotor cover 120 for closing both ends of the rotor body 101 by screwing. An upper shaft 32 which is a sample passage and also serves as a rotation shaft is arranged above the upper rotor cover 110, and a lower shaft 105 which is a sample passage and also serves as a rotation shaft is arranged below the lower rotor cover 120.

Because the rotor 100 is rotationally driven at high speed, during centrifugal separation, the interior of the chamber 11 is kept in a depressurized state for a purpose of suppressing heat generated by windage loss or frictional heat with atmosphere during operation. In order to keep the chamber 11 in the depressurized state, a not-shown discharge port which discharges air inside the chamber 11 is formed in the body portion of the chamber 11, and a vacuum pump which is not shown is connected to the discharge port. The chamber 11 is fixed to the base 12 by a plurality of bolts 13, and the base 12 is fixed to a floor surface by a plurality of bolts 14.

The control device portion 50 accommodates a cooling device (not shown) for cooling the interior of the chamber 11, the vacuum pump (not shown), a lift drive device (not shown) for moving the rotor 100 to a predetermined location, a centrifuge controller (a control portion) (not shown) for driving and controlling the rotor 100, and the like. An operation panel 60 which is a place for operating/inputting is disposed on an upper part of the control device portion 50. The control portion is configured by an electronic circuit (not shown) including a microcomputer and a storage device, and the control portion not only drives and controls the rotor 100, but also controls the entire continuous centrifuge.

Figure 2:
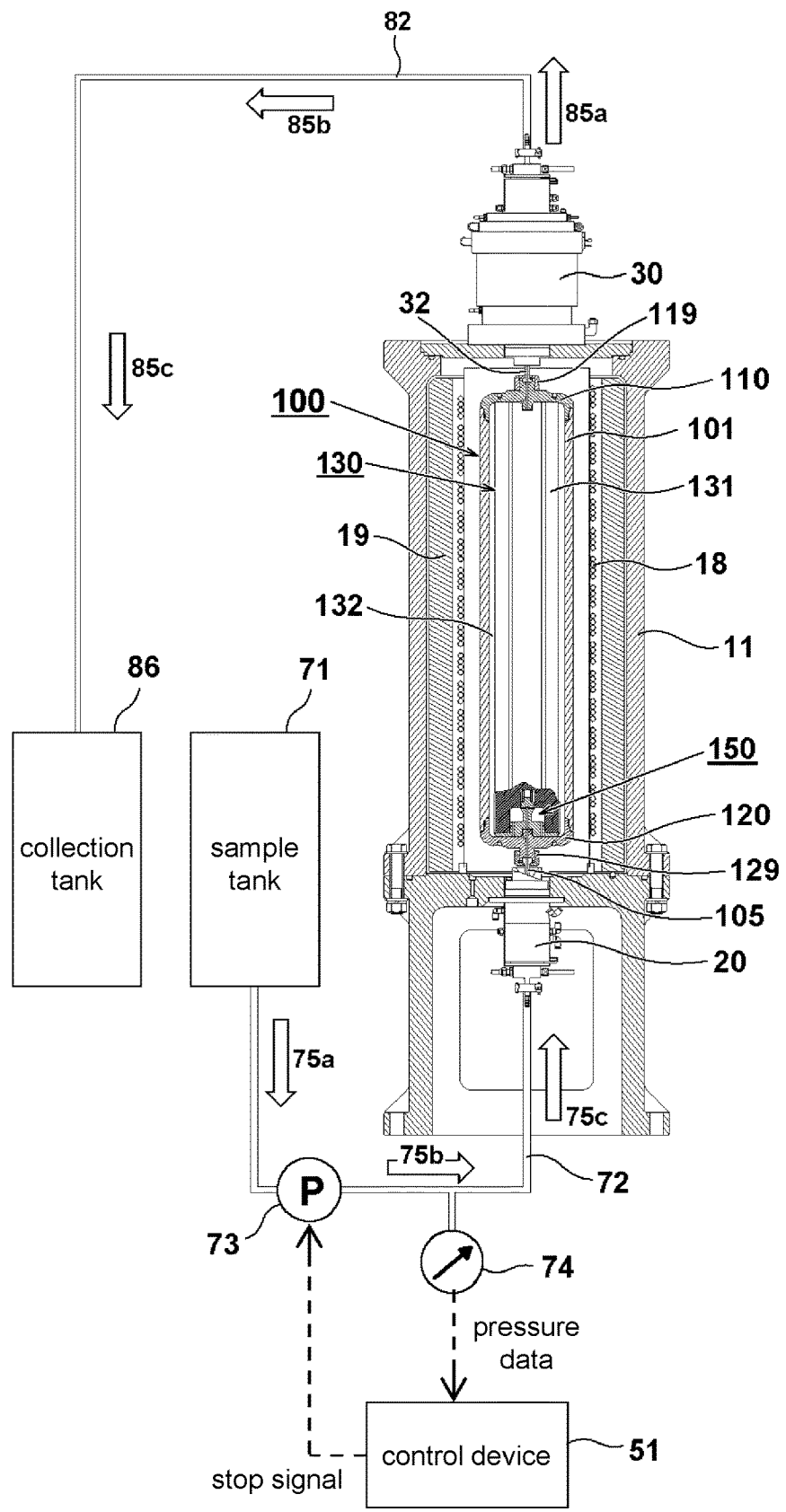
FIG. 2 shows a cross-sectional view showing a detailed structure of a centrifugal separation portion of FIG. 1 and a piping diagram of a sample circulation portion.

FIG. 2 is a cross-sectional view showing a detailed structure of the centrifugal separation portion 10 of FIG. 1. In the chamber 11, the rotor 100 in a state of being suspended by the drive portion 30 in the interior of the chamber 11 is accommodated, a cylindrical evaporator (an evaporation pipe) 18 is installed in a manner of covering a circumference of the rotor 100, and a cylindrical protector 19 which functions as a defense wall is installed outside the evaporator 18. The evaporator 18 is constituted by a copper pipe for circulating refrigerant gas, and can cool the accommodation space of the rotor 100.

Inside the rotor 100, a rotor core 130 is installed for introducing an injected sample into a high gravity field. The rotor core 130 divides the interior of the rotor 100 into a plurality of centrifugal separation spaces by a core body 131 and blade-shaped partition walls 132 (132*a* to 132*f* described later with reference to FIG. 5) arranged in the body portion of the core body 131. The drive portion 30 is mounted on a distal end portion of the lift 16 (see FIG. 1), and rotatably supports the upper shaft 32. A sample passing hole extending in a vertical direction is formed at a position of an axial center in the interior of the upper shaft 32, and forms a part of an upper sample passage. A lower end portion of the upper shaft 32 extends in a funnel shape, and the upper rotor cover 110 is fixed to the upper shaft 32 by a nut 119 in a manner of communicating the sample passing hole and a sample passing hole formed in the upper rotor cover 110. In this way, the rotor 100 is suspended from the drive portion 30, and the upper shaft 32 is rotated at high speed by drive of a motor included in the drive portion 30, and thereby the rotor 100 connected to the upper shaft 32 also rotates at high speed. The lower shaft 105 which is the rotation shaft portion is mounted on a lower side of the rotor core 130. A sample passing hole forming a part of the lower sample passage penetrates through an axial center of the lower shaft 105, and the sample passing hole is connected to a lower pipe 72 by communicating a sample passing hole formed in the lower rotor cover 120.

The rotor core 130 is mounted in the interior of the rotor 100 in a manner that the rotor core 130 can be taken in and out. When the centrifugal separation is performed, the sample injected from the lower shaft 105 passes through the sample passing hole on the lower side and is introduced to the interior of the rotor 100 upward from below. The sample introduced into the rotor 100 is moved to a high centrifugal force field by the rotor core 130 and separated into a precipitate and a supernatant, and the supernatant (waste liquid) is discharged upward from the upper shaft 32.

In the embodiment, a series of lines (the flow paths) from a sample tank 71 to a collection tank 86 excluding the interior of the rotor 100 are defined as a "sample line". The sample to be centrifugally separated flows from the sample tank 71 that stores the sample toward the liquid sending pump 73 in a direction of an arrow 75*a*, passes through the liquid sending pump 73 and flows into the lower bearing portion 20 through the lower pipe 72 as shown by arrows 75*b* and 75*c*. The sample flows into the interior of the rotor 100 from the lower bearing portion 20, and the supernatant (the waste liquid) that is separated by the high speed rotation of the rotor 100 flows into the drive portion 30 through the upper shaft 32 and flows from the drive portion 30 through an upper pipe 82 as shown by arrows 85*a* to 85*c* to reach the collection tank 86. Although it is not shown here, direction switching valves which are not shown may also be arranged in the flow paths of the lower pipe 72 and the upper pipe 82 so as to discharge air contained in the flow path or the sample, or to inject or discharge other liquids.

A sensor 74 is inserted in a way of the lower pipe 72. The sensor 74 measures a pressure of the liquid and a flow rate of the liquid supplied to the sample line. A control device 51 controls drive of the liquid sending pump 73 by using output of the sensor 74 to acquire pressure data, and continuously sends the sample to the rotor 100 while driving the liquid sending pump 73 when the rotor 100 performs the centrifugal separation operation.

An air trap mechanism 150 is arranged in the interior of the rotor 100. The air trap mechanism 150 is a separation mechanism for capturing bubbles contained in the sample (the liquid) which is sent into the rotor 100, and is disposed in a lower side part of the rotor core 130. The sample separated by the air trap mechanism 150 and having gas removed is sent to the centrifugal separation space (a separation space 137 described later with reference to FIG. 3) in the rotor core 130. The gas captured by the air trap mechanism 150 is mainly air, and if the sample contains bubbles of other gas, these bubbles can also be collected. When the gas captured by the air trap mechanism 150 becomes full, the sample flow path is clogged with flowing of the air, and thus the pressure of the sample line increases. The increase of the pressure is monitored using the sensor 74, and thereby the control device 51 can detect that the gas captured by the air trap mechanism 150 is full (a full tank). The control device 51 that detects a full tank state of the air trap mechanism 150 can send a stop signal to the liquid sending pump 73.

Although not described in FIG. 2, the lower pipe 72 may also be equipped with a direction switching valve in order that the sterilizing solution can also flow in the sample line, and a part of the sample which is supplied from the sample tank 71 and has a large amount of bubbles may also be discharged to the outside from the direction switching valve. In addition, the lower pipe 72 may also be equipped with an air detection sensor (not shown) for detecting whether there is liquid in the flow path. As the air detection sensor, a sensor can be used that emits light from one side wall side of the flow path, receives the light by a light sensor arranged on the opposite side wall, and judges whether the liquid is present in the flow path depending on the intensity of the light. With the sensor, whether a specific position of the flow path is filled with the liquid or mixed with the air (or is filled with the air) can be detected. Although not shown, the light sensor may also be used in the upper pipe 82 to detect whether the flow path is filled with the liquid. The output of these air detection sensors is input to the control device 51.

When the control device 51 confirms a state that the rotor 100 is filled with the sample sent by the liquid sending pump 73 and the sample is discharged from the upper pipe 82, the control device 51 controls the not-shown motor of the drive portion 30 and accelerates the rotor 100 to the high speed rotation. When the rotor 100 rotates, the air trap mechanism 150 also rotates together with the rotor 100. As a result, the sample filled in a sub centrifugal separation space (a sub separation space 151 described later with reference to FIG. 3) which is formed in the air trap mechanism 150 is rotated, and thus the bubbles present in the sample in the sub separation space 151 move toward a center. Then, because the sample other than the bubbles is located near an outer periphery, continuous centrifugal separation of the sample is performed by sending the liquid from an outer part of the sub separation space 151 to a main centrifugal separation space.

Figure 3:
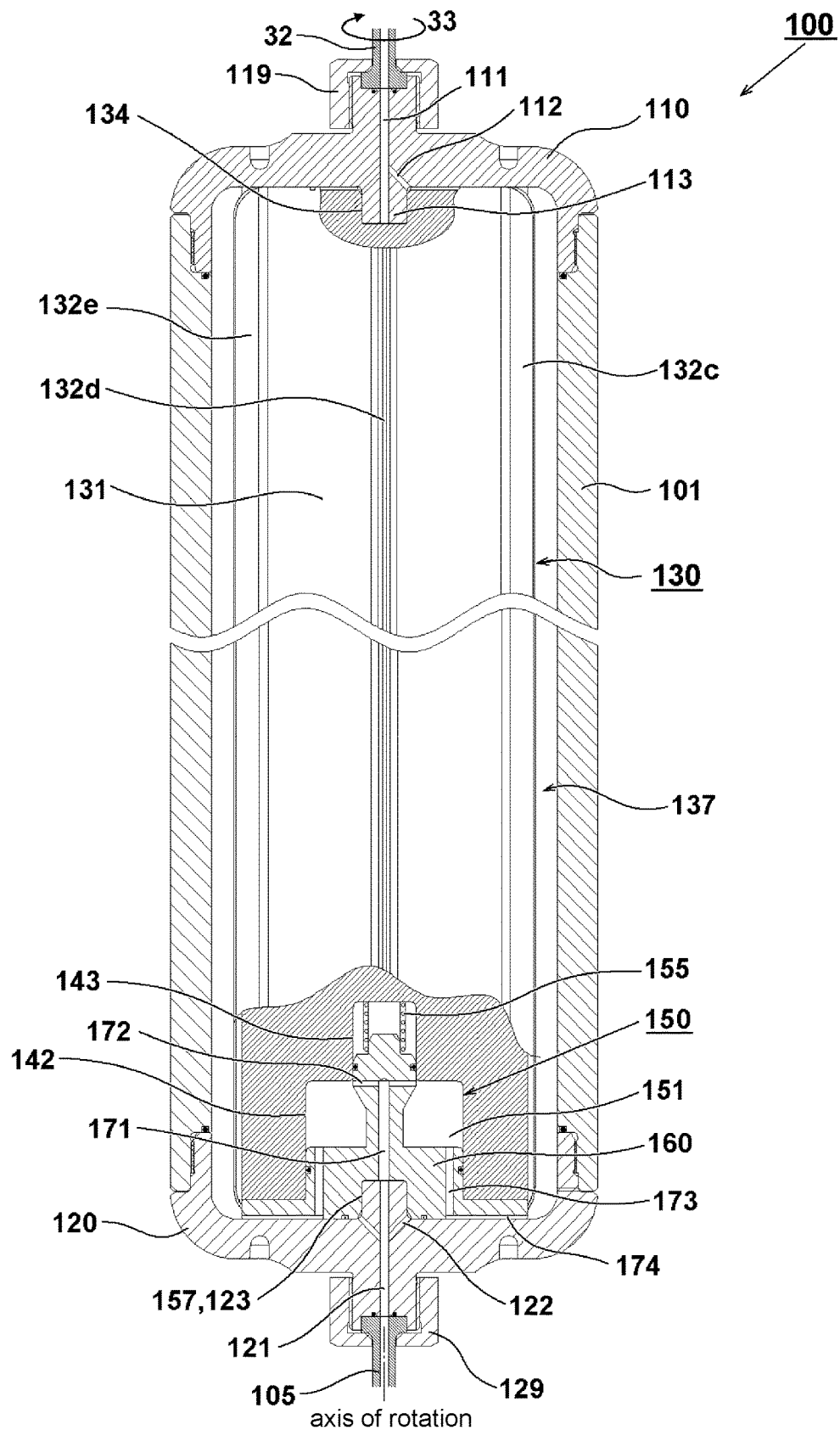
FIG. 3 is an enlarged cross-sectional view of a rotor of FIG. 2.
Figure 10:
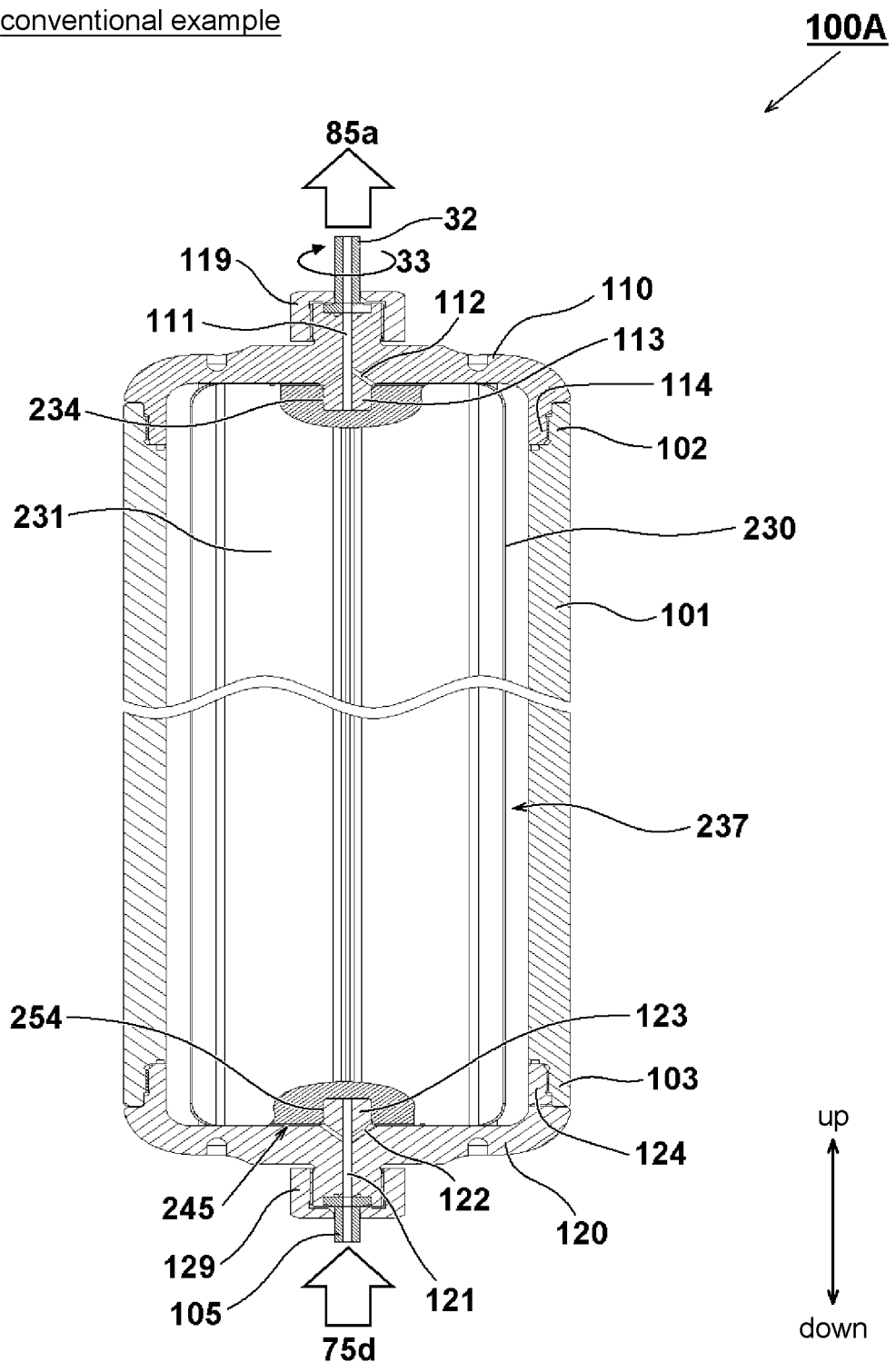
FIG. 10 is a longitudinal cross-sectional view of a rotor of a conventional example.

FIG. 3 is an enlarged view of the rotor 100 of FIG. 2. The rotor 100 of the embodiment is different from a rotor conventionally used in a shape of the core body 131 and that the air trap mechanism 150 is arranged below the core body 131. In the rotor 100, the cylindrical rotor body 101 that has upper and lower openings, the upper rotor cover 110 that closes the upper opening of the rotor body 101 and has the sample passing hole at a rotation center, and the lower rotor cover 120 that closes the lower opening of the rotor body 101 and has the sample passing hole at the rotation center, are common components with a conventionally used rotor 100A (described later with reference to FIG. 10). A sample passage 111 extending along an axis of rotation, and sample branch passages 112 formed in a manner of obliquely branching from a way of the sample passage 111 are formed in the upper rotor cover 110. The sample passage 111 communicates a sample communication hole formed in the upper shaft 32. The upper shaft 32 is fixed to the upper rotor cover 110 by the nut 119. A sample passage 121 extending along the axis of rotation and sample branch passages 122 formed in a manner of obliquely branching from a way of the sample passage 121 are formed in the lower rotor cover 120. The sample passage 121 communicates with the sample communication hole formed in the lower shaft 105. The lower shaft 105 is fixed to the lower rotor cover 120 by a nut 129.

When the not-shown motor of the drive portion 30 rotates, the upper shaft 32 rotates in a direction of an arrow 33, and the entire rotor 100 also rotates in synchronization with the upper shaft 32. Because the lower shaft 105 is rotatably supported by the lower bearing portion 20 (see FIG. 1), the lower shaft 105 rotates together with the rotor 100.

The air trap mechanism 150 is disposed in the lower side part of the rotor core 130. Therefore, a recess portion 142 that is recessed in two steps in a concave shape on an axially upper side and a spring holding hole 143 are formed in an end portion on an axially lower side of a conventional rotor core, and the lower opening of the spring holding hole 143 is closed by the core end surface component 160, and thereby the centrifugal separation space, that is, the sub separation space 151 is arranged which has the purpose of separating and collecting the bubbles contained in the sample. Due to the high speed rotation of the rotor 100, the centrifugal force is also applied to the sub separation space 151, the bubbles contained in the sample move radially inward, and the sample from which the bubbles have been removed moves radially outward. In the core end surface component 160, a radial hole 172 is formed which communicates with an axial hole 171 communicating with the sample passage 121 and serves as an inlet passage to the sub separation space 151. Furthermore, in the core end surface component 160, an axial hole 173 which serves as an outlet passage from the sub separation space 151 is formed. The axial hole 173 is disposed in parallel with the axis of rotation, one side of the axial hole 173 opens near the outside in the radial direction of the sub separation space 151, and the other side of the axial hole 173 is on a lower surface of the core end surface component 160 and opens on an upper surface side of the lower rotor cover 120. The lower opening of the axial hole 173 opens in an inner peripheral side end portion of a radial groove 174 which is formed in a manner of extending in the radial direction on the lower surface of the core end surface component 160, and thereby the radial groove 174 forms a sample passage from the axial hole 173. A plurality of (six in the embodiment) axial holes 173 are formed and disposed in a manner of radially extending outward in the radial direction (details will be described later with reference to FIG. 6). Openings on an outer peripheral side of the radial grooves 174 open in a main separation space 137 for the centrifugal separation. A columnar portion on an upper side of the core end surface component 160 is located in the spring holding hole 143, and is biased by the spring 155 in a manner that the rotor core 130 and the core end surface component 160 are separated from each other.

Figure 4:
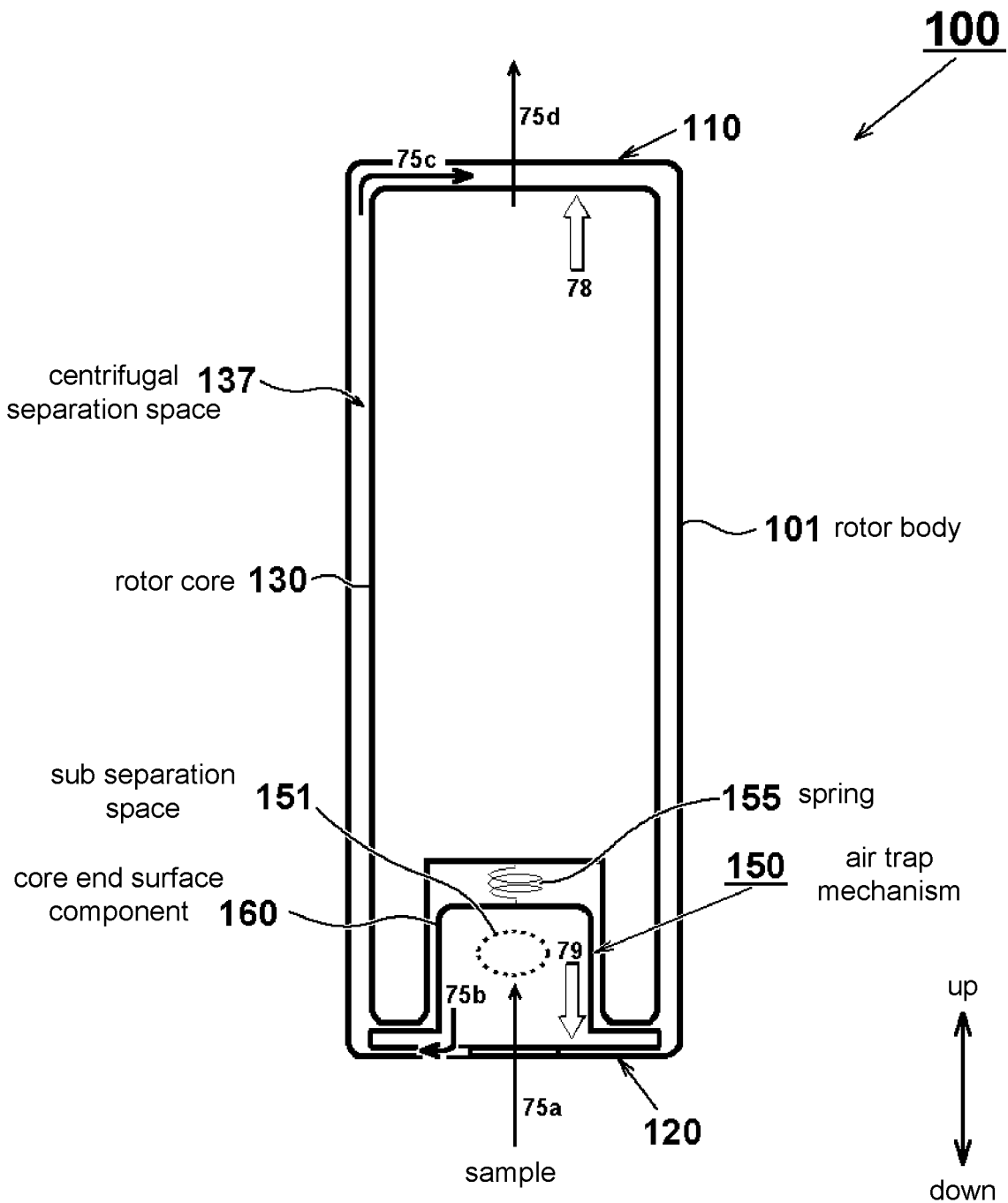
FIG. 4 is a schematic view for showing an arrangement structure and a flow of a sample of an air trap mechanism in the rotor.

FIG. 4 is a schematic view for showing an arrangement structure and the flow of the sample of the air trap mechanism 150 in the rotor 100. In the embodiment, a configuration is used in which the core end surface component 160 separated from the rotor core 130 is arranged in the rotor core 130 installed in the interior of the rotor 100, and the spring 155 for pressing the end surface component 160 is arranged in the interior of the rotor core 130, and thereby the rotor core 130 and the core end surface component 160 are pressed against the lower rotor cover 120 and the upper rotor cover 110. The end surface component 160 is a member that is cut out in a disc shape in the vicinity of a lower end portion of a conventional core body, and is biased in a manner that the cut out disc-shaped member and a lower core body are separated by the spring 155 in a rotation shaft direction, and the core end surface component 160 is pressed against the lower rotor cover 120 in a direction of an arrow 79. By the reaction, the rotor core 130 is pressed against the upper rotor cover 110 as shown by an arrow 78. Furthermore, the space (the sub separation space 151 of FIG. 3) formed between the core body 131 and the core end surface component 160 is used as the centrifugal separation space for removing the bubbles contained in the sample. The sample that flows as shown by the arrow 75a via the lower rotor cover 120 flows into the sub separation space 151 and is separated into the bubbles and the liquid by the centrifugal force. This is because the core end surface component 160 is also disposed in the rotor 100, and thus the centrifugal force also acts on the sub separation space 151 by the rotation of the rotor 100.

When the centrifugal separation is performed, firstly, liquids having different densities (density liquids) are sequentially added before rotating the rotor 100. For example, after a liquid with a low density is added, a liquid with a high density is added and the separation space 137 is filled with liquid layers of liquids having different densities. Thereafter, the rotor 100 is rotated to the predetermined rotation speed, and then the liquid sending pump 73 is driven to start liquid sending from the sample tank 71 (see FIG. 2) added with the sample to be separated. When the sample is injected into the rotor 100 as shown by the arrow 75a, the sample is first supplied into the air trap mechanism 150, and thereby in the sub separation space 151, the bubbles contained in the sample move to the inner peripheral side due to a specific gravity difference between the bubbles and the sample (the liquid), and the bubbles mixed in the sample moves to the inner peripheral side. Because the outlets of the sub separation space 151 are arranged on the outer peripheral side part of a radial intermediate position, that is, on a side close to the radial outer side, the sample flows radially outward on the lower surface of the core end surface component 160 as shown by the arrow 75b, and flows into the separation space 137.

As described above, because the air trap mechanism 150 is arranged which can automatically capture the bubbles in the sample before the sample flows into the separation space 137 of the rotor, a configuration is achieved in which the bubbles in the sample liquid is prevented from entering the separation space 137. In addition, because the flow path between the rotor core 130 and the rotor covers (110, 120) is maintained in a perfect state by using the spring 155, and the bubbles in the liquid are prevented from entering the flow path, the continuous centrifuge 1 can be achieved which can smoothly send liquid at low pressure without clogging the flow path with the bubbles. Furthermore, by setting an overall length of the rotor core 130 and a dimension of the spring 155 to appropriate values, a phenomenon may be avoided in which the rotor body 101 and the rotor covers (110, 120) are deformed during the high speed rotation, and the rotor core 130 is subjected to a load from the rotor covers (110, 120).

Figure 5A:
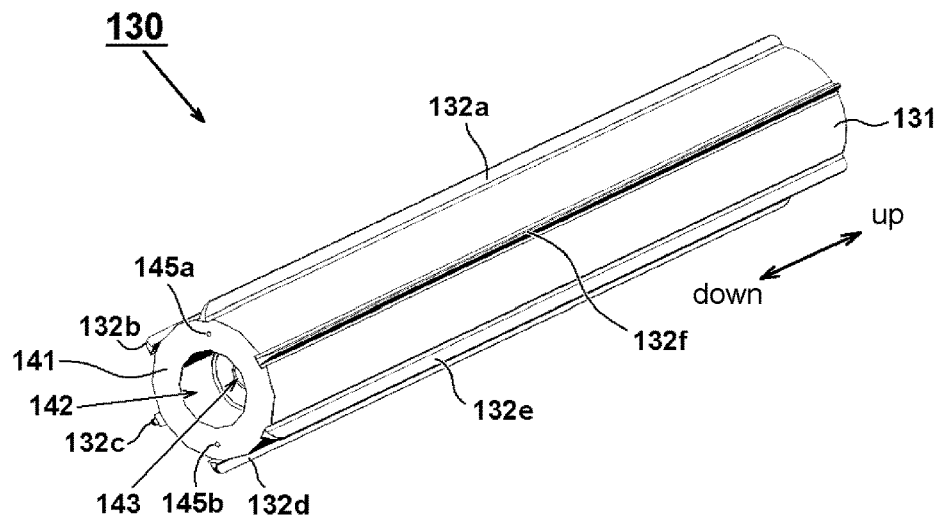
FIG. 5(A) is a perspective view showing a rotor core of FIG. 3.

FIG. 5(A) is a perspective view showing the core body 131. The core body 131 is made of a synthetic resin, and six blade-shaped partition walls 132a to 132f protruding in a peripheral direction are formed on the outer peripheral side of the solid and columnar core body 131. The partition walls 132a to 132f are continuous in the axial direction and integrally formed with the core body 131, and the outer peripheral side end portions of the partition walls 132a to 132f abut the inner peripheral surface of the rotor body 101, and thereby the separation space 137 (see FIG. 3) is evenly divided into six spaces in the peripheral direction. On the lower end surface side of the core body 131, two concave portions (the recess portion 142 and the spring holding hole 143) that are recessed in the columnar shape in the axial direction are formed for arranging the air trap mechanism 150. An annular core lower end surface 141 is formed on the outer peripheral side of the recess portion 142. Pin holes 145a and 145b are formed at two positions on a periphery of the core lower end surface 141 for fitting pins 168a and 168b for location decision that are arranged in the core end surface component 160.

Figure 5B:
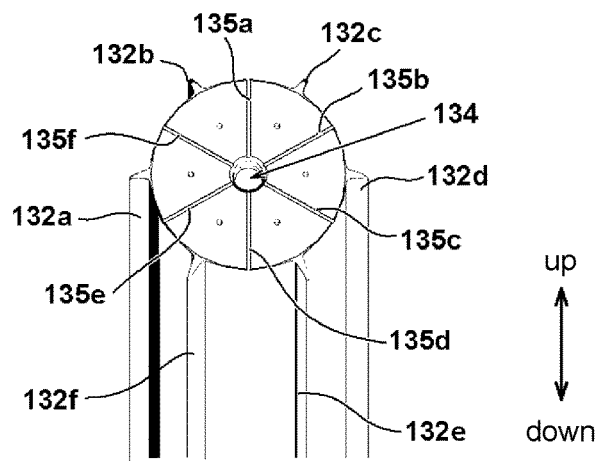
FIG. 5(B) is a perspective view of an upper surface of the rotor core.
Figure 5C:
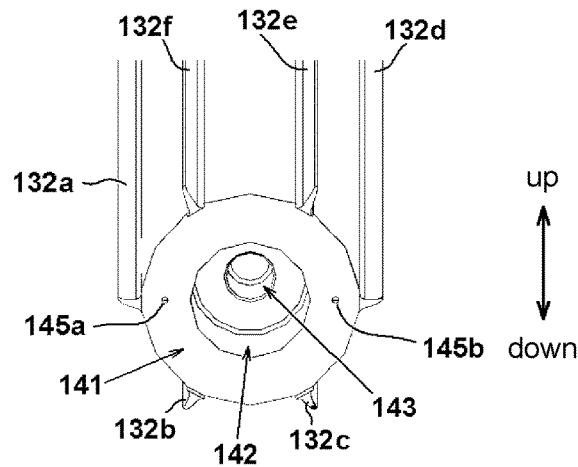
FIG. 5(C) is a perspective view of a bottom surface of the rotor core 130.

FIG. 5(B) is a perspective view of an upper surface of the core body 131. The shape of the upper surface is the same as the shape of the core body in the conventional rotor. A cylindrical fitting hole 134 is formed in the center of an upper end surface of the core body 131, that is, a surface contacting with an inner wall of the upper rotor cover 110. In addition, six core end surface grooves 135a to 135f are formed which extend from an outer edge of the upper end surface to the fitting hole 134 in the radial direction. The core end surface grooves 135a to 135f contact with the inner wall of the upper rotor cover 110 to thereby form sample passages for discharging supernatant liquid having a low specific gravity on the inner peripheral side of the separation space 137. Here, the sample passages are located near the middle of the six partition walls 132a to 132f disposed at equal intervals on the outer peripheral side of the core body 131. FIG. 5(C) is a perspective view of a bottom surface of the core body 131. The shape of the bottom surface portion of the conventional core body is basically the same as the shape shown in FIG. 5(B). However, in the embodiment, in order to secure a space for arranging the air trap mechanism 150, the recess portion 142 and the spring holding hole 143 are formed.

Here, for comparison, a further problem to be solved during centrifugal operation using a core body 231 in the conventional rotor 100A is described with reference to FIGS. 10 to 13. In the configuration of the conventional rotor 100A, only a shape of a rotor core 230 is different from the rotor core 130 of the embodiment shown in FIG. 3, and other configuration components, particularly the rotor body 101, the upper rotor cover 110 and the lower rotor cover 120 are the same. In other words, by replacing the rotor core 230 of the conventional rotor 100A with the rotor core 130 according to the embodiment of the present invention, the rotor 100 with an air trap function according to the present invention is obtained. The upper rotor cover 110 and the rotor body 101 are screwed, and a male screw 114 is formed on a lower end of a cylindrical surface of the upper rotor cover 110, and a female screw 102 is formed in an upper end opening of the rotor body 101. Similarly, the lower rotor cover 120 and the rotor body 101 are screwed, a male screw 124 is formed on an upper end of a cylindrical surface of the lower rotor cover 120, and a female screw 103 is formed in a lower opening of the rotor body 101. The rotor 100A rotates in a rotation direction 33 shown by an arrow by the motor included in the drive portion 30. At this time, the rotor 100A is located in the interior of the chamber 11, decompressed by the not-shown vacuum pump, and is rotationally driven at high speed in a cooled state.

A columnar fitting shaft 113 protruding convexly downward is formed on a lower end side of the upper rotor cover 110, that is, on an axial center part on a side in contact with the core body 231. The sample passage 111 is formed along a central rotation shaft center in the upper rotor cover 110. In the sample passage 111, the sample branch passages 112 are formed which obliquely branch in the radial direction from the way of the sample passage 111. Similarly, a cylindrical fitting shaft 123 protruding convexly upward is formed on an upper end side of the lower rotor cover 120, that is, on an axial center part on a side in contact with the core body 231. The sample passage 121 is formed along a central rotation shaft center in the lower rotor cover 120. The sample branch passages 122 that obliquely branch in the radial direction from the way of the sample passage 121 are formed in the sample passage 121. The continuous sample injection to the interior of the rotor 100A here is performed from below as shown by an arrow 75*d*, and the supernatant liquid (the supernatant), which is separated from the upper side of the rotor 100 via the sample penetration hole of the upper shaft 32 as shown by an arrow 85*a*, is discharged to a not-shown discharge line. Moreover, with respect to a way of injecting the sample into the continuous centrifuge 1, particularly the injection direction, the sample may be injected from the lower side of the rotor 100A and discharged from the upper side, or the sample may be injected from the upper side and the precipitate liquid may be discharged from the lower side in the opposite direction. In the conventional rotor 100A, in the case where a sample supply passage is not completely formed due to dimensional differences of each component, or in the case where the minute bubbles are contained in the sending sample, a sending efficiency of the sample may decrease, and thus, in order to solve these problems, the manufacturing is performed with sufficient processing precision, and the bubbles in the sample are removed before being supplied into the rotor 100A.

Figure 11:
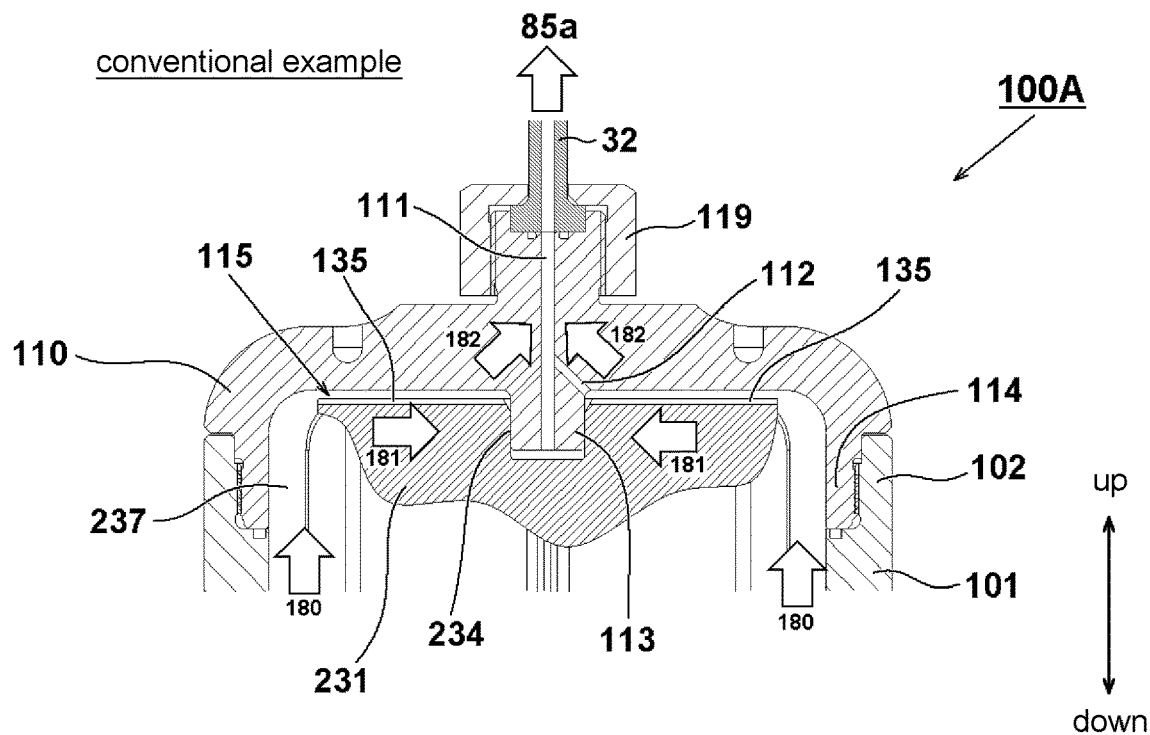
FIG. 11 is a partial cross-sectional view showing a flow of a sample in an upper side part of the rotor of the conventional example.

FIG. 11 is a partial cross-sectional view showing a flow of the sample in the upper side part of the rotor 100A. When the rotor 100A is assembled (not rotated), if the core body 231 is inserted into the rotor body 101 in an opened state in which the upper rotor cover 110 is removed, and then the upper rotor cover 110 is mounted, a gap 115 may be formed between the upper surface of the core body 231 and the inner surface of the upper rotor cover 110 due to machining process tolerances (and individual differences in components). The gap 115 cannot be completely zero for assembly. A flow of the separated sample near the upper rotor cover 110 is as shown by arrows 180 to 182 and 85*a*. That is, in a separation space 237 in the rotor 100A, the supernatant liquid part having the low specific gravity moves upward as shown by arrows 180, moves through the core end surface grooves 135 formed on the upper end surface of the core body 231 toward the inner peripheral side as shown by arrows 181, and flows through the sample branch passages 112 as shown by arrows 182 and joins in the sample branch passages 112, and then, the supernatant liquid part flows in the direction of the arrow 85*a* and is discharged to the outside of the rotor 100A. At this time, in an upright state (a state where the upper shaft 32 is on the upper side) as shown in FIG. 2, because the core body 231 falls downward due to its own weight, the gap 115 on the upper side becomes large, and the flow paths (the core end surface grooves 135) are not formed completely due to the gap 115 between the upper surface of the core body 231 and the upper rotor cover 110, and if the sample is sent when the rotation is stopped or the like, the presence of the gap 115 becomes a resistance of the sample sending, and high pressure is required to send the sample.

Figure 12:
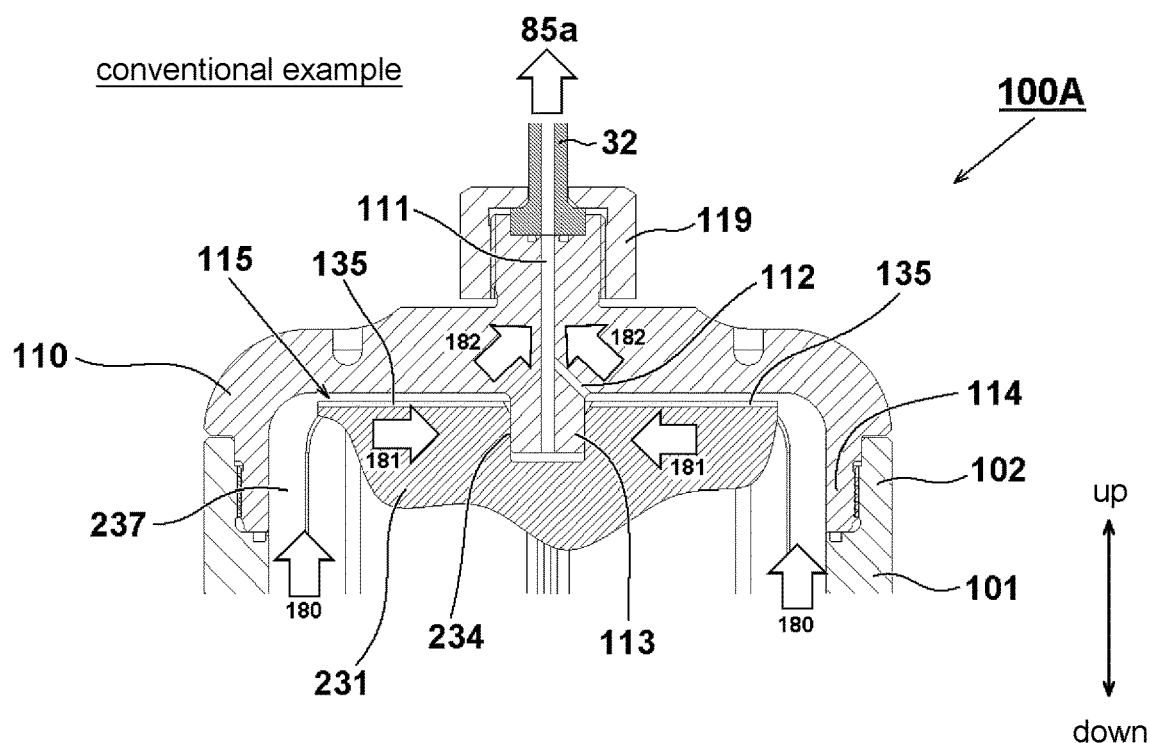
FIG. 12 is a partial cross-sectional view showing a pressure direction during ultra-high speed rotation in the upper side part of the rotor of the conventional example.

FIG. 12 is a partial cross-sectional view showing a pressure direction during ultra-high speed rotation in the upper side part of the rotor 100A. When the rotor 100 rotates at high speed, if the centrifugal force of the rotor body 101 located on the outer peripheral side increases, the rotor body 101 deforms in a manner of bulging outward in the radial direction as shown by an arrow 281. The deformed position becomes large near a vertical center of the rotor body 101, and in extreme embodiments, the rotor body 101 bulges into a barrel shape (actual bulge is very small). When the rotor body 101 deforms as shown by the arrow 281, the upper rotor cover 110 also similarly deforms outward as shown by an arrow 282. Because the upper rotor cover 110 has a bowl-like shape with the opening facing downward, the inner surface deformed inward toward the vertical center of the rotor 100A as shown by an arrow 283. Then, the upper rotor cover 110 comes into contact with the core body 231 and presses the core body 231 as shown by an arrow 284. A pressing force in the rotation shaft direction becomes stronger as a rotation speed of the rotor 100A increases, and the core body 231 is subjected to a great load acting in the axial direction. Although the core body 231 may not be damaged by this level of load, it is not preferable to apply or release the great load on the core body 231 from a viewpoint of product life.

Figure 13:
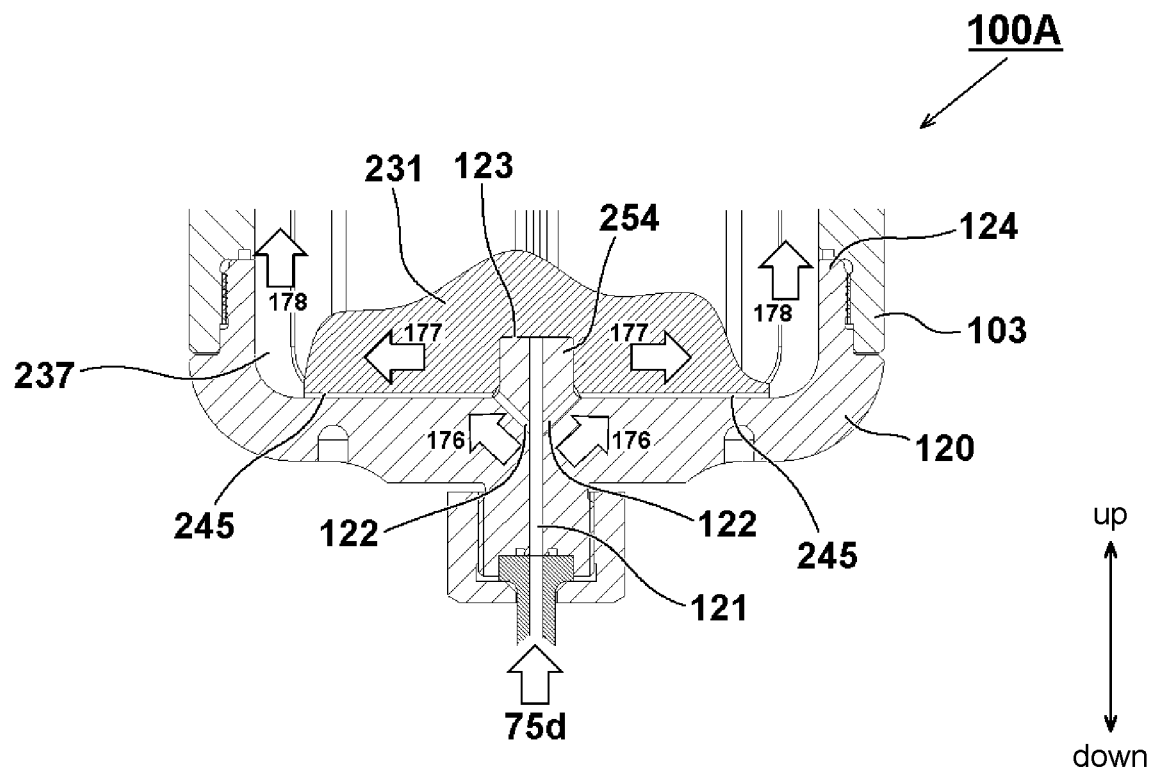
FIG. 13 is a partial cross-sectional view showing a flow of the sample in a lower side part of the rotor of the conventional example.

FIG. 13 is a partial cross-sectional view showing a flow of the sample in a lower side part of the rotor 100A in the conventional example. The flow of the sample in the lower side part is similar to that in the upper side part of the rotor, and the sample which flows from the sample passage 121 in the direction of the arrow 75*d* flows through the sample branch passages 122 as shown by arrows 176, flows through radial passages 245 in directions of arrows 177, and then reaches the separation space 237. In the separation space 237, the centrifugal separation operation is performed while the sample continuously flows in directions of arrows 178. In the lower side part of the rotor 100A, a force in a direction of axially compressing the rotor core 230 from the lower rotor cover 120 (a force in a direction opposite to the arrows 283 and 284 in FIG. 12) also acts as in FIG. 12 during the high speed rotation.

Figure 6A:
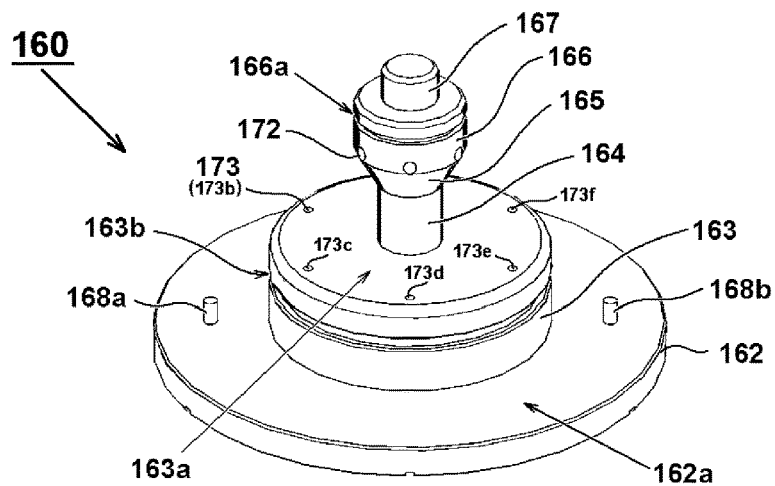
FIG. 6(A) is a perspective view showing a core end surface component of FIG. 3.

Return to the description of the embodiment again. FIG. 6(A) is a perspective view showing the core end surface component 160. The core end surface component 160 is formed of six portions in a rotation axis direction, and when viewed in the rotation axis direction, from the lower side, the six portions include a disc portion 162, a large-diameter columnar portion 163 formed on an upper side of the disc portion 162, a small-diameter portion 164 located above the large-diameter columnar portion 163, and a medium-diameter columnar portion 166 disposed on the upper side of the small-diameter portion. A taper portion 165 whose diameter gradually changes is arranged between the small-diameter portion 164 and the medium-diameter columnar portion 166. In addition, a fitting shaft 167 for holding the spring 155 (see FIG. 3) is formed above the medium-diameter columnar portion 166. Each of these portions (the disc portion 162, the large-diameter columnar portion 163, the small-diameter portion 164, the taper portion 165, the medium-diameter columnar portion 166 and the fitting shaft167) is manufactured by integral formation of a synthetic resin. A space between an outer peripheral side of the small-diameter portion 164 and the taper portion 165 and the recess portion 142 (see FIG. 5) of the rotor core 130 is an air trap space for trapping the bubbles, that is, the sub separation space 151 (see FIG. 3).

The disc portion 162 forms a surface that is in contact with an inner wall of the lower rotor cover 120, and has the same outer diameter as the core body 131 (see FIG. 5) excluding the partition walls 132*a* to 132*f* (see FIG. 5). In addition, pins 168*a* and 168*b* for stopping the rotation are arranged in the disc portion 162, so as to prevent relative rotation between the core body 131 and the disc portion 162 and prevent a relative position from shifting. The pins 168*a* and 168b may be manufactured integrally with the disc portion 162, or may be individual components. Here, the pins 168a and 168b are individual metal pins. The large-diameter columnar portion 163 has an outer diameter corresponding to an inner diameter of the recess portion 142 of the core body 131. On an outer periphery of the large-diameter columnar portion 163, a peripheral groove 163b is formed that is continuous in the peripheral direction for arranging an O ring for sealing. Axial holes 173a to 173f extending in a manner of penetrating in the longitudinal direction are arranged near the radial outer side of the large-diameter columnar portion 163, and upper openings of these axial holes 173a to 173f are opened on an upper surface 163a of the large-diameter columnar portion 163.

Figure 6B:
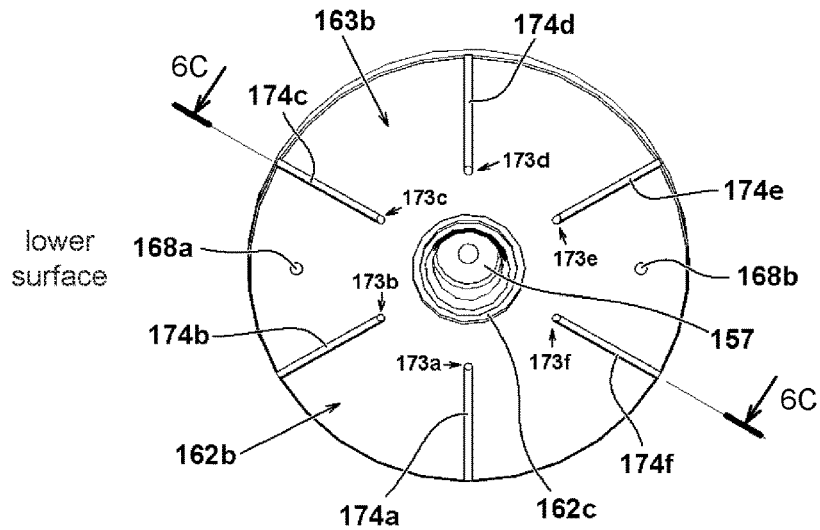
FIG. 6(B) is a perspective view of the core end surface component when viewed from a bottom surface side.

FIG. 6(B) is a perspective view of a bottom surface side of the disc portion 162 of the core end surface component 160. The axial holes 173a to 173f are connected to inner peripheral side end portions of the radial grooves 174a to 174f extending to the outer circumferential portion in the radial direction, and the inner peripheral side end portions of the radial grooves 174a to 174f are the end portions of the lower side of the axial holes 173a to 173f in FIG. 6(A). The radial grooves 174a to 174f extend to an outer edge of a bottom surface 162b of the disc portion 162. An annular groove 162c for accommodating the not-shown O ring is formed on the outer peripheral side of a fitting hole 157 which is formed in the center.

Figure 6C:
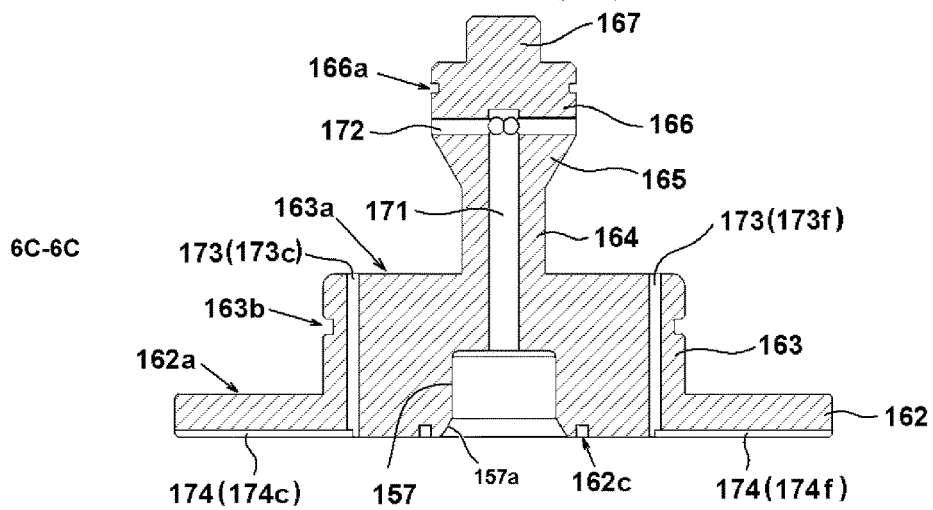
FIG. 6(C) is a longitudinal cross-sectional view of the core end surface component 160.

FIG. 6(C) is a cross-sectional view along line 6C-6C in FIG. 6(B) (a longitudinal cross-sectional view including the rotation shaft). The medium-diameter columnar portion 166 which is formed on the upper side of the small-diameter portion 164 is a part located in the spring holding hole 143 (see FIG. 3), and holds the spring 155 (see FIG. 3) on an upper surface of the medium-diameter columnar portion 166. In order to hold the spring 155 of a compression coil type, the fitting shaft 167 which is consistent with an inner diameter of the spring 155 is formed on an axially upper side of the medium-diameter columnar portion 166. The axial hole 171 is formed along the rotation shaft center from the large-diameter columnar portion 163 through the small-diameter portion 164 and the taper portion 165 to the medium-diameter columnar portion 166. A lower end of the axial hole 171 opens at a boundary surface with the fitting hole 157, and an upper end of the axial hole 171 communicates with the radial hole 172 which extends radially. The fitting hole 157 for fitting the fitting shaft 123 of the lower rotor cover 120 is formed below the lower end of the axial hole 171. The annular groove 162c is formed for arranging the not-shown O ring on an outer peripheral side of the fitting hole 157. The fitting hole 157 is columnar, and a taper portion 157a which has a diameter expending slightly toward the lower side is formed on the lower side end portion. The taper portion 157a is arranged for easily inserting the fitting shaft 123 of the lower rotor cover 120.

Figure 7A:
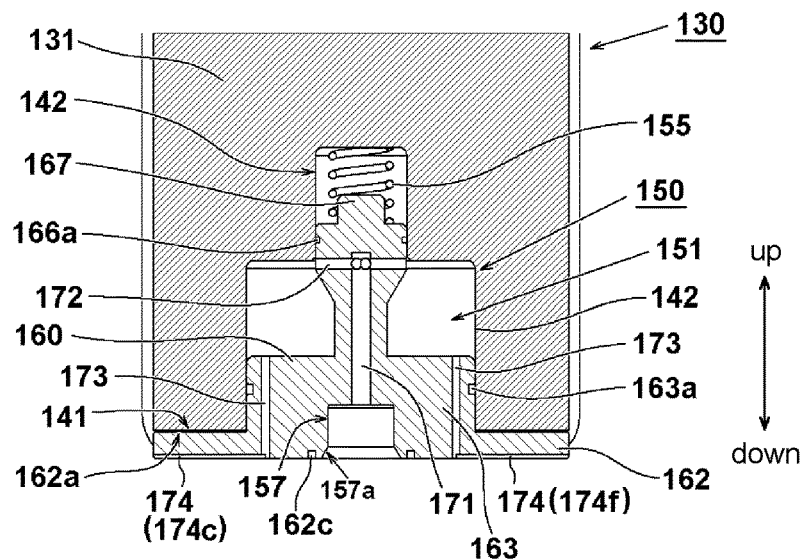
FIG. 7(A) is a longitudinal cross-sectional view showing a combination state of a core body and the core end surface component of FIG. 3.

FIG. 7 shows a combination state of the core body 131 and the core end surface component 160, and FIG. 7(A) is a longitudinal cross-sectional view. The sub separation space 151 is defined by closing an opening of the recess portion 142, which is a lower side part of the core body 131, by the core end surface component 160. The radial hole 172 which is formed in the core end surface component 160 has a positional relationship of opening in the sub separation space 151. In addition, the axial holes 173 formed in the core end surface component 160 open in the sub separation space 151. An upper surface 162a of the disc portion 162 of the core end surface component 160 abuts the core lower end surface 141 of the core body 131. In order that the sample does not flow through the core lower end surface 141 of the core body 131, the peripheral groove 163b is formed on the outer peripheral side of the large-diameter columnar portion 163 of the core end surface component 160, and an O ring (not shown) is intervened in the peripheral groove 163b to seal the space in a manner that the sample does not flow into the core lower end surface 141 from the sub separation space 151. The core end surface component 160 is biased downward by the spring 155 in a manner of being movable in the rotation shaft direction with respect to the core body 131. A peripheral groove 166a is formed between the upper surface side of the sub separation space 151 and a space accommodating the spring 155, and an O ring (not shown) is intervened in the peripheral groove 166a to seal the space in a manner that the sample does not flow into the accommodation space of the spring 155 from the sub separation space 151.

Figure 7B:
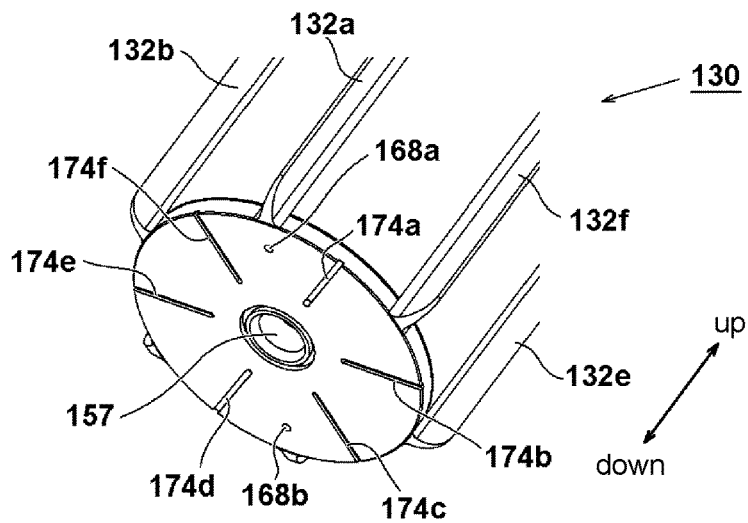
FIG. 7(B) is a perspective view of the combination state when viewed from the bottom surface side.
Figure 7C:
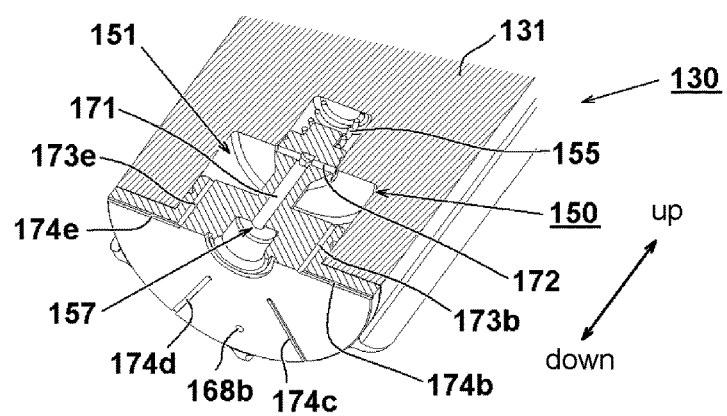
FIG. 7(C) is a cross-sectional perspective view of a cross-section including an axis of FIG. 7(B).

FIG. 7(B) is a perspective view of the rotor core 130 when viewed from a bottom surface side. Accordingly, the shape viewed from the bottom surface side is the same as the shape of the conventional rotor core 230 shown in FIG. 10. Therefore, the rotor core 230 of the conventional rotor 100A shown in FIG. 10 can be replaced with the rotor core 130 according to the embodiment. FIG. 7(C) is a cross-sectional perspective view of a cross section including the rotation shaft of FIG. 7(B). As can be understood from the diagram, the air trap mechanism 150 is accommodated in the part which is solidly formed in the conventional rotor 100A, and does not affect a volume of the separation space 137 (see FIG. 3) formed between the rotor core 130 and the rotor body 101. Furthermore, in the rotor core 130 of the embodiment, the core end surface component 160 is biased by the spring 155 in the direction away from the core body 131 when viewed in the axial direction, and thus the core end surface component 160 and the lower rotor cover 120, and the rotor core 130 and the upper rotor cover 110 can brought into close contact with each other at an appropriate pressure. Moreover, if there is a positional relationship that a slight gap is between the upper surface 162a of the disc portion 162 and the core lower end surface 141 during mounting, even when an axial force acting by a centrifugal load as shown by the arrow 283 in FIG. 12 is subjected, the influence of the force applied in the axial direction can be absorbed by an action of the gap between the upper surface 162a and the core lower end surface 141 and the spring 155, and thus the sample passages can be appropriately maintained from stopping to the high speed rotation.

Figure 8:
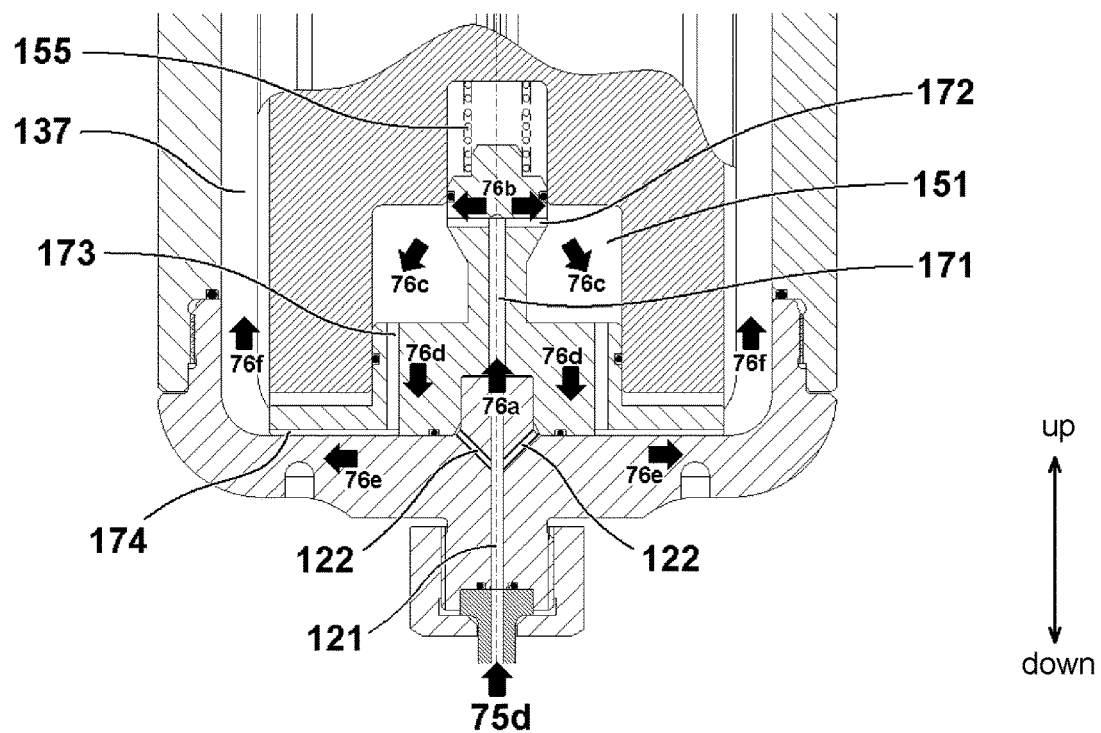
FIG. 8 is a first diagram showing the flow of the sample in the air trap mechanism.

FIG. 8 is a first diagram showing the flow of the sample in the air trap mechanism 150. The sample, which is injected into the interior of the rotor 100 as shown by the arrow 75d from the sample penetration hole of the lower shaft 105 (see FIG. 3) by the liquid sending pump 73 (see FIG. 2), flows toward the upper side in the rotation axis direction as shown by an arrow 76a from the sample passage 121 arranged in the lower rotor cover 120, and flows into the axial hole 171. The sample flowing into the axial hole 171 flows into the sub separation space 151 through the radial hole 172 as shown by arrows 76b. In the sub separation space 151, the bubbles and the sample are separated by the centrifugal force. In this way, the bubbles contained in the sample are automatically captured by the air trap mechanism 150 which is formed by the core end surface component 160 on one end side of the rotor core 130, and the bubbles are not introduced into the flow paths formed by the radial grooves 174 and the lower rotor cover 120, and thereby the radial grooves 174 are not clogged and the sample is smoothly sent at low pressure. The bubbles that have been dissolved in the liquid and do not appear at normal pressure are also separated from the sample by being subjected to the centrifugal load in the air trap mechanism 150, and are trapped before being sent to the outer circumferential portion (the separation space 137) with high liquid pressure.

The sample from which the bubbles are removed reaches the radial grooves 174 through the axial holes 173 as shown by arrows 76d, flows toward the radial outer peripheral side as shown by arrows 76e, and reaches the separation space 137. Here, the core end surface component 160 is in a state of being pressed against the lower rotor cover 120 with respect to the core body 131 by the spring 155, and thereby the flow path formed between the radial grooves 174 and the lower rotor cover 120 can be kept in a perfect state constantly without being influenced by individual differences of the components, and the liquid can be smoothly sent by pressure. In the separation space 137, an ingredient having a large specific gravity accumulates on the outer peripheral side, and an ingredient having a small specific gravity (the supernatant) is pushed to the upper side as shown by arrows 76f by the sample continuously flowing into the separation space 137. Moreover, by setting the overall length of the rotor core 130 and the core end surface component 160 and a movement dimension of the spring 155 to appropriate values, the rotor core 130 and the core end surface component 160 may always be in good contact with the lower rotor cover 120 and the upper rotor cover 110 due to a tension of the spring 155, and a load caused by the deformation of the rotor 100 generated during the high speed rotation can be preferably received by the spring 155.

Figure 9:
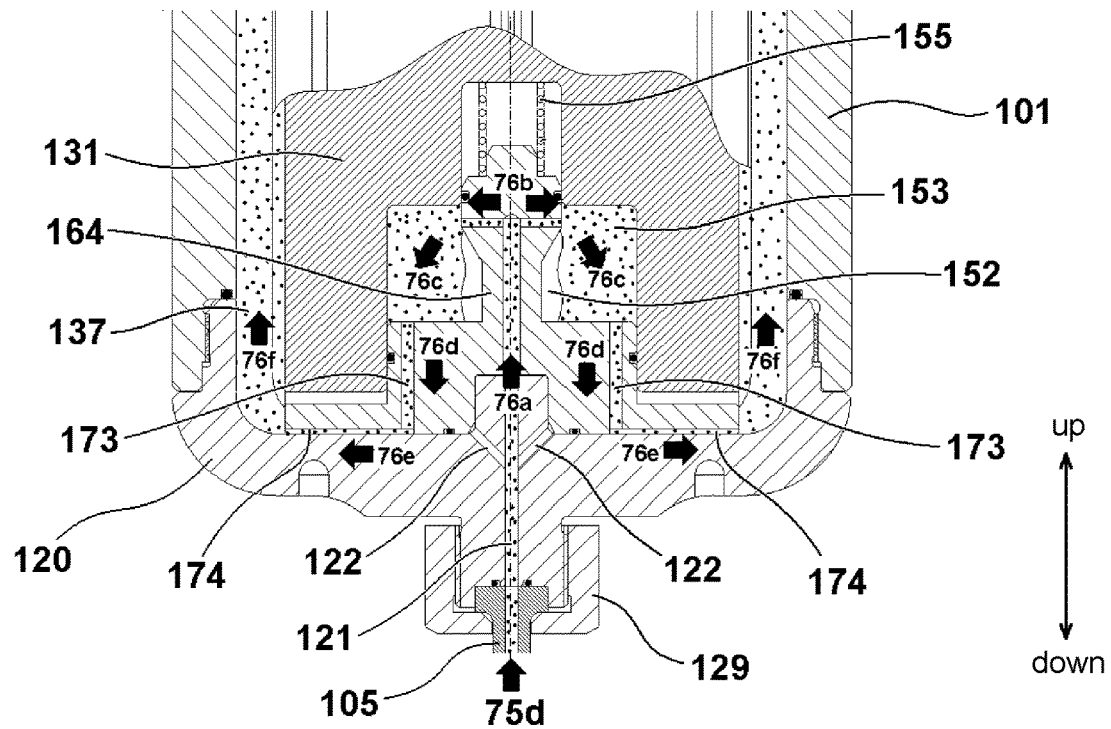
FIG. 9 is a second diagram showing the flow of the sample in the air trap mechanism.

FIG. 9 shows a state where the centrifugal separation proceeds forward from the state of FIG. 8, and gas 152 is collected in the sub separation space 151. As can be seen from FIG. 9, the sample flowing into the sub separation space 151 is separated into the gas 152 (mainly the air) and liquid 153 (the sample) due to the difference in the specific gravity, the liquid 153 with large specific gravity moves to the outer peripheral side, and the gas 152 with small specific gravity moves to the inner peripheral side. Because the axial holes 173 which are the outlets of the sub separation space 151 are formed near an outermost periphery of the sub separation space 151, the axial holes 173 open in a part filled with the liquid 153. Therefore, when the sample is continuously sent as shown by the arrow 75d, the liquid 153 having the gas removed in the sub separation space 151 is discharged from the axial holes 173 as shown by the arrows 76d by pressure of the flowing sample, flows through the radial grooves 174 as shown by the arrows 76e, and is discharged into the separation space 137 on the outer peripheral side. The sample is centrifugally separated while flowing to the upper side as shown by the arrows 76f in the separation space 137. In this way, the sample passing through the flow paths formed between the radial grooves 174 which are formed in the lower surface of the core end surface component 160 and the lower rotor cover 120 is supplied to the separation space 137, and then the sample is centrifugally separated by the centrifugal force. Because the sample supplied to the separation space 137 is after the gas ingredients such as the bubbles and the like are removed, a possibility that the centrifugal separation efficiency is reduced due to the influence of the bubbles contained in the sample can be eliminated.

As described above, according to the embodiment, the bubbles contained in the sample before reaching the centrifugal separation space 137 in the rotor 100 are separated and removed by the centrifugal force generated by the rotation of the rotor 100, and thus low sending pressure can be maintained when the sample is continuously supplied to the rotor 100. As a result, the continuous centrifuge 1 according to the embodiment can stably supply the sample to the rotor 100 continuously and can obtain good centrifugation performance. In addition, because the rotor core 130 and the core end surface component 160 are axially movable by the spring 155, the influence of the compressive load received from the rotor body 101 and the rotor covers (110, 120) which are slightly deformed due to the centrifugal load can be absorbed, and thus life of both the rotor body 101 and the rotor core 130 can be expected to extend.

Although the present invention has been described above based on the embodiment, the present invention is not limited to the above-described embodiment, and various changes may be made without departing from the gist of the present invention. For example, in the continuous centrifuge 1 of the embodiment described above, the embodiment of the lower sample supply in which the sample to be separated is put into the rotor 100 from the lower pipe 72 has been described, but the present invention is not limited thereto. An upper sample supply may also be applied similarly in which the sample is put into the rotor 100 from the upper pipe 82 and the waste liquid or the separated sample is collected into the collection tank 86 from the lower pipe 72. In this case, the air trap mechanism 150 may be arranged on an upper part of the rotor core 130. Furthermore, materials of the core may be metal such as titanium alloy or the like, and in this case, preferably, the core is made hollow except for the vicinity of the air trap mechanism 150, the weight of the core is reduced, and the specific gravity per volume is equal to the specific gravity of water as much as possible (for example, 1 to 1.2 g/mm$^3$).

What is claimed is:

1. A continuous centrifuge, comprising: a rotor having a core that partitions an interior into a plurality of spaces for separating a sample; a rotor chamber that accommodates the rotor; a drive portion for rotating the rotor; and a sample line for continuously supplying the sample to the rotor and discharging the sample from the rotor during rotation of the rotor, wherein
    an air trap is arranged for capturing bubbles from the sample by a centrifugal force and separates the bubbles from the sample with the centrifugal force by rotating together with the rotor before the sample supplied from the sample line reaches a sample separation space in the rotor.

2. The continuous centrifuge according to claim 1, wherein the air trap is arranged in the interior of the rotor, and sends the sample from which the bubbles have been captured to the sample separation space.

3. The continuous centrifuge according to claim 2, wherein the air trap is disposed in an inner peripheral part of the sample separation space of the core.

4. The continuous centrifuge according to claim 3, wherein the core has a hollow cylindrical body portion in which blade-shaped partition walls evenly dividing the interior of the rotor into a plurality of spaces are protruded on an outer circumferential portion, and end portions which are arranged in a manner of closing an upper end surface and a lower end surface of the body portion; and
    the air trap comprises a concave portion which is formed in the end portion of the body portion on a sample supply side, and a core end surface component that fits into the concave portion for forming a centrifugal separation space in the concave portion.

5. The continuous centrifuge according to claim 4, wherein the core end surface component is movable in a rotation shaft direction with respect to the core, and a spring is disposed in the concave portion to bias in a direction in which the core and the core end surface component are separated; and an opposite side of the core of the core end surface component is formed into an annular shape corresponding to an inner wall surface of a rotor cover on the sample supply side of the rotor.

6. The continuous centrifuge according to claim 5, wherein a portion of the annular shape of the core end surface component, a plurality of axial flow paths and radial flow paths are formed, in the plurality of axial flow paths, the sample is extracted from an outer peripheral side of the centrifugal separation space to the opposite side of the core in the axial direction, and the radial flow paths are grooves formed on a surface on the opposite side of the core of the core end surface component and extend radially from the axial flow paths in a radial direction.

7. The continuous centrifuge according to claim 6, wherein the radial flow paths are the grooves formed on the surface on the opposite side of the core of the core end surface component and formed by an inner peripheral surface of the rotor cover.

8. The continuous centrifuge according to claim 7, wherein the rotor comprises a cylindrical rotor body, and an upper rotor cover and a lower rotor cover installed in a manner of closing an upper opening and a lower opening of the rotor body; and in the core end surface component, a sample passage is formed which extends along a rotation shaft center and is communicated with a sample inflow passage of the lower rotor cover, and the sample passage opens in a middle peripheral part in the radial direction in the centrifugal separation space.

9. The continuous centrifuge according to claim 8, wherein the core is pressed against an inner wall surface of the upper rotor cover by a biasing force of the spring.

* * * * *